United States Patent [19]
Scheer

[11] 3,791,614
[45] Feb. 12, 1974

[54] PIVOTABLE WALL MOUNTING BRACKET

[76] Inventor: Donald M. Scheer, 4407 Central Ave., Indianapolis, Ind. 46205

[22] Filed: July 12, 1972

[21] Appl. No.: 270,942

[52] U.S. Cl. ................................. 248/216, 52/713
[51] Int. Cl............................................ E05d 17/00
[58] Field of Search ........ 248/291, 289, 216, 220.5; 16/130, 159; 52/707, 711, 713, 714, 239

[56] References Cited
UNITED STATES PATENTS

| | | | |
|---|---|---|---|
| 2,307,274 | 1/1943 | Jenkins | 248/216 X |
| 3,363,373 | 1/1968 | Huss | 52/98 |
| 3,729,162 | 4/1973 | Salvato | 248/291 |
| 3,348,346 | 10/1967 | Heim et al. | 52/714 X |
| 1,105,666 | 8/1914 | Johnson | 16/137 |

FOREIGN PATENTS OR APPLICATIONS

| | | | |
|---|---|---|---|
| 1,086,655 | 10/1967 | Great Britain | 16/130 |

Primary Examiner—J. Franklin Foss
Attorney, Agent, or Firm—Woodard, Weikart, Emhardt & Naughton

[57] ABSTRACT

A first and second element are pivotally hinged together. The first element is separated into a first and second portion by an indented line extending laterally across the first element. The first portion has a tapered configuration for driving the first element into a wall and an alternate embodiment has an end positioned at a right angle to hook over a brick when the bracket is mounted to a brick wall. The first element includes a pair of ears upon which the second element is mounted. The ears form stop surfaces for limiting the inward travel of the first element into the wall. The second element has a plurality of slidably mounted fastening nuts which are positioned between the second element and the wall. The bottom end of the second element extends inwardly towards the wall and cooperatively with the stop surfaces spaces the second element from the wall preventing the fastening nuts from contacting the wall.

3 Claims, 5 Drawing Figures

PATENTED FEB 12 1974  3,791,614

3,791,614

PIVOTABLE WALL MOUNTING BRACKET

BACKGROUND OF THE INVENTION

1. Field of the Invention

This invention is in the field of brackets.

2. Description of the Prior Art

Many types of brackets have heretofore been proposed for use particularly in mounting various items such as drapes, curtains, shelving and the like; however, such brackets have not been completely satisfactory because they incorporated special attaching devices which were easily lost. Moreover, in most instances, the prior art brackets were not easily mountable to a variety of walls with each bracket being designed for a specific wall. In many cases, it is desirable to mount the bracket on the top horizontal surface of a window frame which protrudes outwardly from the wall. In this case, a special bracket having a limited length is required due to the space limitation. Once the prior art brackets are mounted, it becomes difficult to paint the wall without removing the bracket or painting over the bracket. Many of the prior art brackets do not provide adjustment means to facilitate the mounting of various types of items to the bracket.

Disclosed herein is a bracket which will mount to a variety of different types and sizes of walls. Likewise the bracket disclosed herein may be mounted to the top horizontal surface of a window frame. The bracket is pivotally constructed to enable the bracket to be swung upwardly out of the way when the wall is being painted. Slidable fastening nuts are mounted to the bracket to enable various types of items to be mounted to the brackets and for leveling purposes after attachment of items.

SUMMARY OF THE INVENTION

One embodiment of the present invention is a bracket for mounting to a wall comprising a first element having a first main body with a first end and a second end with a pair of parallel spaced apart ears integrally attached at the second end, the first element being weakened by an indented line extending laterally across the element dividing the element into a first portion including the first end and a second portion including the second end which may be manually broken along the line and separated, and a second element having a second main body with a top end with a pair of flanges pivotally and hingedly mounted to the ears and with a bottom end portion extending out and at an angle from the second main body for abutting the wall and spacing the second main body from the wall when the second main body is positioned down adjacent the wall.

It is an object of the present invention to provide a new and improved bracket for mounting to a wall.

It is a further object of the present invention to provide a wall mounting bracket which may be easily mounted to a variety of different types and sizes of wall.

In addition, it is an object of the present invention to provide a wall mounting bracket which may be easily moved away from the wall to enable the wall to be painted.

Related objects and advantages of the present invention will be apparent from the following description.

DESCRIPTION OF THE PREFERRED EMBODIMENTS

Figure 1:
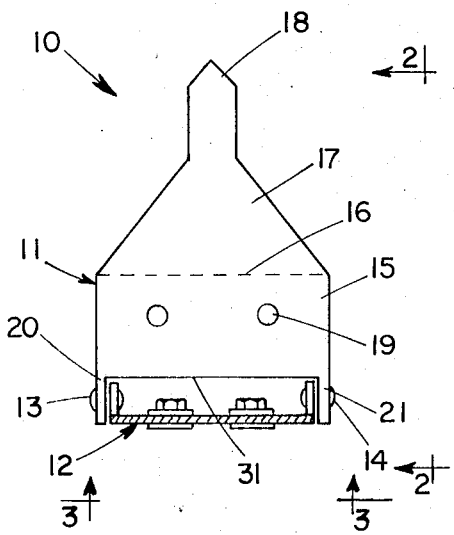
FIG. 1 is a top view of a bracket incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a wall mounting bracket 10 including a first element 11 and a second element 12 pivotally connected together. Element 11 has a first portion 15 and a second portion 17 separated by an indented line 16 extending laterally across the element. Portion 17 has a sharp tapered end 18 to enable element 11 to be driven into a wall such as a wooden wall until the wall contacts stop surfaces 22 which are formed on ears 20 and 21 of portion 15. Portion 15 includes a plurality of holes 19 through which fasteners may extend. Whenever element 11 is to be driven into a wall, holes 19 are not utilized; however, in the case where element 11 is to be mounted to the top horizontal surface of a window or door frame which extends outwardly from a wall, then element 11 is bent along line 16 until the element is broken into two pieces with one piece being portion 17 which is discarded. Portion 15 is then placed atop the horizontal surface of the frame and fasteners are utilized to mount portion 15 to the frame by extending through holes 19. It is anticipated that element 11 will be produced from metal and that line 16 will be a line which is indented thereby reducing the thickness of the element and providing a weakened area facilitating the easy breakage of the element into two portions and can be made without indented line 16 for stronger applications.

Figure 2:
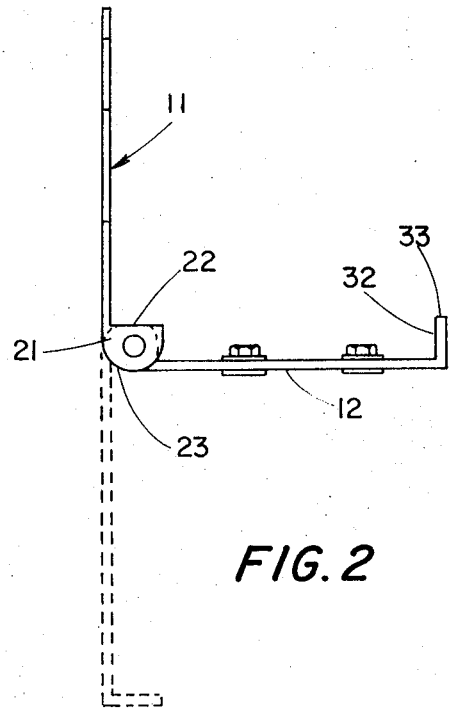
FIG. 2 is a side view looking in the direction of arrows 2—2 of FIG. 1.
Figure 3:
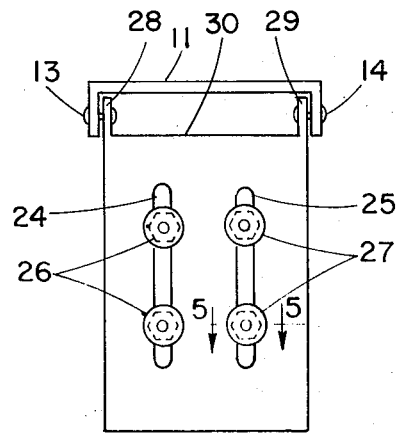
FIG. 3 is an end view looking in the direction of arrows 3—3 of FIG. 1.

Ears 20 and 21 are offset from the main body of element 11 forming the stop surfaces 22 to limit the inward movement of the first element into a wall. Standard fastening devices, such as rivets 13 and 14, extend through ears 20 and 21 and flanges 28 and 29 of element 12 thereby providing for the hinged connection between the two elements. The main body of element 12 includes a pair of longitudinally extending slots 24 and 25 with fastening nuts 26 and 27 slidably mounted therein. The bottom end 32 of bracket 12 extends at a right angle away from the main body of element 12 so as to contact the wall when element 12 is swung to the downward position preventing nuts 26 and 27 from contacting the wall. Stop surfaces 22 as well as the outer surface 33 of end 32 cooperatively contact the wall. As shown in FIG. 2, bracket 12 may be swung from a position adjacent the wall to the upward position indicated by the dashed lines thereby facilitating the painting or cleaning of the wall. Each ear includes a radiused outer edge 23. The edge 31 of element 11 is spaced from element 12 whereas edge 30 of element 12 is spaced from element 11 thereby enabling element 12 to be swung to the upward position as shown in FIG. 2.

Fastening nuts 26 and 27 are standard fastening nuts and include a flanged portion 34 which extends through the slot and then outwardly preventing disengagement of the nut from the slot. Flange 34 is loose with respect to element 12 thereby enabling the nut to be moved along the length of the slot. The main body 35 of the nut is integrally attached to flange 34 and includes internal threads 36 for receiving a conventional fastener for mounting of any type of item to the nut.

Figure 4:
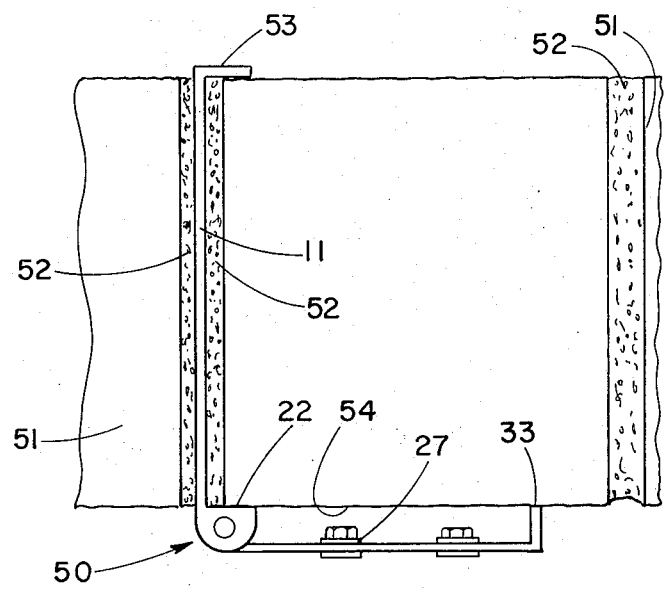
FIG. 4 is the same view as FIG. 2 only showing an alternate embodiment of the bracket mounted to a brick wall.
Figure 5:
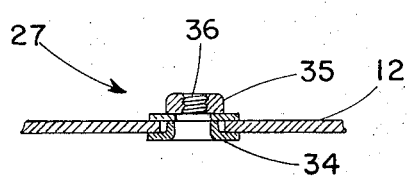
FIG. 5 is an enlarged fragmentary cross sectional view taken along the line 5—5 of FIG. 3 and viewed in the direction of the arrows.

An alternate embodiment of bracket 10 is shown in FIG. 4. Bracket 50 is identical with bracket 10 with the exception that end 53 of element 11 extends at a right angle with respect to the main body of element 11 and is spaced from stop surfaces 22 a distance equal to the width of a brick. Thus, when building a brick wall, element 11 may be positioned between bricks 51 with end 53 positioned on one side of the brick and with stop surfaces 22 positioned on the other side of the brick. Mortar 52 is positioned on either side of the main body of element 11 between bricks. Element 11 of bracket 50 is also provided with the indented lines 16 to provide for the situation where the bracket is to not be mounted to a brick wall but is to be mounted to the horizontal surface of a frame. Portion 17 of bracket 50 which includes end 53 may be provided with the tapered configuration shown in FIG. 1. End 53 may be preformed or manually formed at the construction site. The outer surface 54 of the brick wall will not contact the fastening nuts 27 since the second element is positioned outwardly by stop surfaces 22 and surface 33.

It should be noted that the parallel spaced apart ears 20 and 21 are integrally attached to one end of element 11 in such a way so as to simultaneously provide for a pivotal connection as well as stop surfaces 22. It should also be noted that line 16 allows element 11 to be manually broken by the installer depending upon the exact mounting requirements.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. It is anticipated that when the bracket, when utilized for the mounting of heavy objects, such as awnings, will not have the weakened line 16.

The invention claimed is:

1. A bracket for mounting to a wall comprising:
a first element having a first main body with a first end and a second end with a pair of parallel spaced apart ears integrally attached at said second end, said first element being weakened by an indented line extending laterally across said element dividing said element into a first portion including said first end and a second portion including said second end which may be manually broken along said line and separated; and,
a second element having a second main body with a top end with a pair of flanges pivotally and hingedly mounted to said ears and with a bottom end portion extending out and at an angle from said second main body for abutting said wall and spacing said second main body from said wall when said second main body is positioned down adjacent said wall;
said ears are offset from said first main body each forming a stop surface for limiting inward movement of said first element into said wall and cooperatively with said bottom end portion spacing said second main body from said wall, each stop surface is perpendicularly arranged with respect to said first main body to abut said wall;
said first portion of said first element has a sharp tapered configuration for driving into a wall until said stop surfaces contact said wall.

2. The bracket of claim 1 wherein:
said first end of said first element extends at a right angle to said first main body and is spaced from each stop surface a distance equal to the width of a brick.

3. The bracket of claim 2 and further comprising:
a plurality of fastening nuts mounted to said second element and positioned between said second element and said wall when said second element is adjacent said wall, said bottom end portion spacing said second element from said wall preventing said nuts from contacting said wall;
said second main body has longitudinally extending slots with said nuts being slidably mounted therein;

said second portion of said first element includes a plurality of holes through which fasteners may extend into said wall for the mounting of the bracket.

* * * * *